May 27, 1930.　　　O. C. TRAVER　　　1,760,531
PROTECTIVE ARRANGEMENT
Filed May 14, 1928
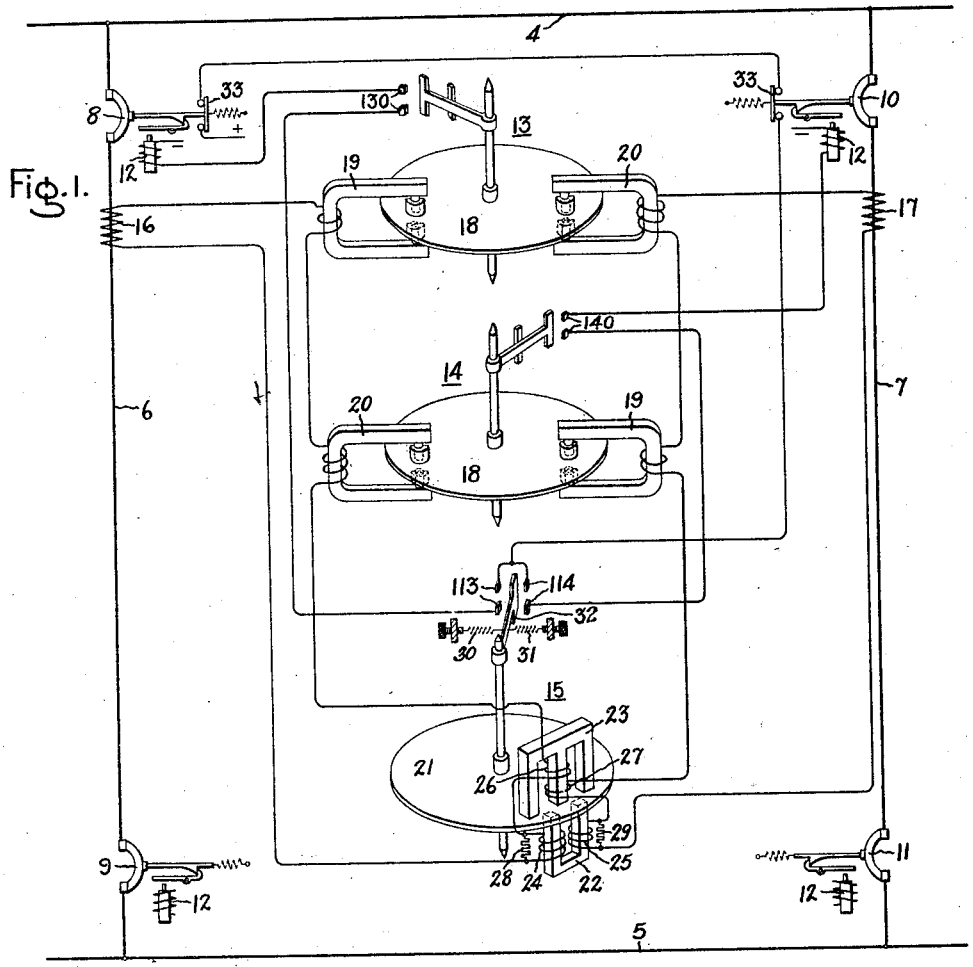
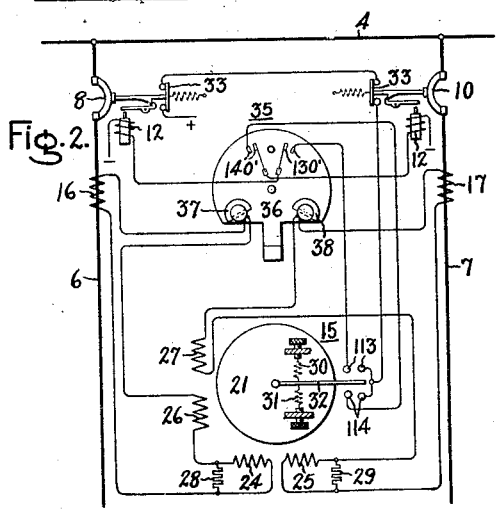
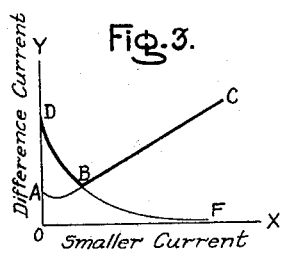
Fig.3.
Inventor:
Oliver C. Traver
by Charles E. Tullar
His Attorney Patented May 27, 1930

1,760,531

UNITED STATES PATENT OFFICE

OLIVER C. TRAVER, OF SCHENECTADY, NEW YORK, ASSIGNOR TO GENERAL ELECTRIC COMPANY, A CORPORATION OF NEW YORK

PROTECTIVE ARRANGEMENT

Application filed May 14, 1928. Serial No. 277,550.

My invention relates to improvements in protective arrangements for electric circuits and more particularly to balanced protective arrangements for parallel circuits, such as feeders and the like, and an object of my invention is to provide an improved balanced protective arrangement wherein the degree of selectivity of the protection is made most nearly proportionate to the demands of the service.

Where two parallel circuits are provided with balanced protection for selectivity, the protective apparatus is often so arranged that removal of one of the feeders in service through the opening of a circuit interrupter in that feeder automatically effects a change in the form of protection applied to the circuit remaining in service. This changeover in the protective control is frequently accomplished through the medium of auxiliary switches associated with the circuit interrupting means. In consequence of this, when a circuit is to be restored to service, the closing of the circuit breaker at one end restores the balanced protective equipment and unless the circuit breaker at the other end of the circuit is closed substantially simultaneously, there may exist temporarily the very unbalanced condition for which the protective equipment is designed to operate although there is no real faulty condition. This is an unsatisfactory condition for the restoration of service or putting in service of a second line when the power demand necessitates, since it is liable to result in the interruption of service on the only circuit in operation. An object of my invention is to provide a balanced protective arrangement for parallel circuits so that putting into service of an additional circuit can be accomplished without regard to the manner in which the circuit is established and without the possibility of taking an associated circuit out of service and the consequent interruption caused thereby. Other objects of my invention will appear hereinafter.

My invention will be better understood from the following description when considered in connection with the accompanying drawing and its scope will be pointed out in the appended claims.

In the accompanying drawing, Fig. 1 illustrates diagrammatically in single phase for clearness, a protective arrangement embodying my invention; Fig. 2 illustrates diagrammatically a modification of my invention and Fig. 3 illustrates a selectivity curve or characteristic such as is obtainable with protective apparatus embodying my invention.

Referring now to Fig. 1, outgoing and incoming buses 4 and 5 respectively are arranged to be connected by a plurality of parallel feeders 6 and 7 through suitable circuit interrupting means herein shown as latched-in type circuit breakers 8, 9, 10 and 11, each of which may be provided with a trip coil 12. In accordance with my invention, I provide means for selectively controlling the circuit interrupting means on the occurrence of unbalanced conditions in the circuits 6 and 7 so as to disconnect a faulty circuit. While I have shown this means at only the outgoing end of the feeders for the selective control of the circuit breakers 8 and 10, it is to be understood that it may be applied at either end or both ends of the feeders if existing power sources can cause a definite unbalance at the ends. Also for the sake of clearness only the apparatus necessary for two corresponding phase conductors of the feeders is shown but it is to be understood that like apparatus may be provided for the other phase conductors. The selective control means shown in Fig. 1 includes relay means such as differential relays 13 and 14 and a relay 15 which, as shown, is of the directional type. These relays are connected and arranged to be energized in accordance with the currents in corresponding conductors of the circuits 6 and 7 through suitable means such as current transformers 16 and 17 in case of alternating current circuits.

The differential relay means 13 and 14 may be of the induction disk type as shown each comprising a movable element or conducting disk 18 and actuating means such as shaded pole motor elements 19 and 20 which are arranged to exert opposing torques on their respectively associated disks. The motor elements 19 and 20 will also be designated as the operating and restraining elements of the relays 13 and 14. Preferably, the relays 13 and 14 are of the type which operate in response to the ratio between the currents in the circuits 6 and 7 and will have a characteristic curve which may be represented by the line ABC of Fig. 3. Referring now to Fig. 3, the horizontal axis OX represents the smaller current, usually the current in the sound circuit, and the vertical axis OY represents the difference between the circuit currents. It will be clear from an observation of this curve ABC that operation is such that the greater the current in one circuit the greater the difference between the currents in the two circuits required to effect the operation of the relay and the slope of the substantially straight portion BC is a measure of the ratio of the line currents which must exist before operation of one or the other of the relays 13 and 14 occurs.

While this particular characteristic may be obtained in different ways, I have illustrated in Fig. 1 an arrangement wherein this particular ratio effect is obtained by suitably proportioning the turns on the restraining and operating motor elements. For example, if it is desired that the current in one line be 25% greater than that in the other line before operation of the differential relay is effected, then the restraining motor element 20 may be provided with 25% more turns than the operating motor element 19. The relay 13 is arranged to control contacts 130 in the circuit of the trip coil 12 of the circuit breaker 8 and the relay 14 is arranged to control contacts 140 in the circuit of the trip coil 12 of the circuit breaker 10. When either of the circuit breakers 8, 10 opens, the balanced protective equipment may be rendered temporarily ineffective by any suitable means such as circuit breaker auxiliary switches 33 arranged in series with each other in the trip coil control circuits of the relays 13, 14, 15, as shown.

It will be observed from the characteristic curve ABC of Fig. 3 that the portion AB indicates a selectivity feature such that if the closing of one of the circuit breakers 8 restores the balanced protection while the circuit breaker 9 is open, the load on the circuit 7, assumed to be energized, would be sufficient to cause an unbalance such that the differential relay 14 would tend to operate and thereby to effect the opening of the circuit breaker 10. Obviously this is undesirable since continuity of service would thereby be interrupted. In order to prevent this possibility, I arrange in accordance with my invention to eliminate the effect of that portion AB of the characteristic curve ABC by means such as the relay 15 so as to eliminate the tendency for improper operation. For this purpose the relay 15 is arranged to control contacts 113 and 114 which are respectively arranged in series with the contacts 130 and 140 in the trip coil circuits of the circuit breakers 8 and 10.

The relay 15 may be of the induction disk type as shown and is arranged to cooperate with the differential relays 13 and 14 in accordance with the sum of and the difference between the currents in corresponding conductors of the circuits 6 and 7 and has a characteristic such as indicated by the line DBF shown in Fig. 3. For this purpose the relay 15 may be of the wattmeter type including a disk 21 and a motor element including magnetic members 22 and 23. The magnetic member 22 is arranged to be energized in accordance with the sum of the currents in the circuits 6 and 7 and for this purpose may be provided with two windings 24 and 25 respectively connected to the current transformers 16 and 17 and arranged on the magnetic member 22 so as to provide cumulative or additive fluxes when the currents in the circuits 6 and 7 are in the same direction. The magnetic member 23 may be provided with two windings 26 and 27 respectively connected to the current transformers 16 and 17 and arranged on the magnetic member 23 so as to provide a flux dependent on the difference between the currents of the circuits 6 and 7. With this arrangement, the torque on the disk 21 will be dependent on the product of the sum of and the difference between the currents in the circuits 6 and 7 with a directional action dependent on the difference between the currents. Suitable phase displacing means such as resistors 28 and 29 which may be in parallel relation to the windings 24 and 25 are provided. The disk 21 is arranged to be restrained against movement in either direction by suitable adjustable means such as springs 30, 31 which normally maintain the contact controlling member 32 in a neutral position intermediate the contacts 113 and 114. When the torque exerted by the motor element 23—24 on the disk 21 exceeds a predetermined amount sufficient to overcome either of the springs 30, 31, depending on the direction of the torque, one or the other of the contacts 114 or 113 will be closed by the circuit controlling member 32.

Assuming both feeders 6 and 7 in service as indicated in Fig. 1 and a fault to occur on feeder 6 between the buses 4 and 5 of sufficient intensity to cause the ratio of the currents in the feeders 6 and 7 to exceed the value for which the differential relays 19 and 20 are set to operate, then the operating motor element 19 of the relay 13 overcomes its restraining motor element 20 to effect the closing of the contacts 130. The relay 14 does not close its contacts 140 since its restraining torque is increased. The directional relay 15 is subjected to a torque in a direction sufficient to effect the closing of its contacts 113. Consequently, the circuit of the trip coil 12 of the circuit breaker 8 is completed and the opening thereof is effected. When this circuit breaker opens the balanced protective equipment is temporarily rendered ineffective to control the other feeder 7 since the auxiliary switch 33 of the circuit breaker 8 opens and disconnects the relay control circuits from their source of supply.

If now the circuit breaker 8 is reclosed to again put the feeder 6 in service and this is done before the circuit breaker 9 is closed, then a temporary unbalance exists since one feeder carries all the current and the other none. This is not due to a faulty circuit condition but since the balanced protective equipment is automatically restored to service by the closing of the auxiliary switch 33 of the circuit breaker 8, the relay 14 tends to operate as indicated by its curve ABC. Unless, however, the contacts 114 of the relay 15 can close the circuit breaker 12 will not be tripped. Under these unbalanced conditions the torque on the disk 21 of the relay 15 becomes proportional to the square of the current in the feeder 7. This current is now in effect the difference current OD of Fig. 3 since the current in line 6 is zero. While the disk 21 tends to move in the direction to close contacts 114, the torque is insufficient to overcome the spring 30 unless the current in the feeder 7 exceeds a predetermined value and, therefore, the circuit breaker 10 is not tripped. If the feeder 7 were the one being restored to service then the relay 13 would close its contacts 130 but the relay 15 would not close its contacts 113 unless the torque which is proportional to the square of the current in line 6 were sufficient to overcome the spring 31.

Inasmuch as the electromagnetic torque on the disk 21 is partly dependent on the difference between the circuit currents, there is a discriminating directional effect so that the contacts 113, 114 will be closed according to which circuit has the greater current. Furthermore, as the currents in the circuits 6 and 7 become larger, the more nearly equal they can be and yet provide sufficient torque in a direction to overcome either the spring 30 or 31. The resultant characteristic DBF of the relay 15 is, therefore, of an inverse nature as shown in Fig. 3. Consequently, the composite characteristic of the relays 13 or 14 and 15 is the line DBC. In other words through the range DB the final control is in the relay 15 while through the range BC the final control is in the relays 13 or 14. Thus while, throughout a range in which the difference current is relatively high but the actual line currents are comparatively small, the sensitivity of the protection is reduced, it is possible to insure better operation in putting a line into service and greater continuity of service without impairing the protection. On the other hand as the currents increase, the ratio control of the differential relays is the selective feature in the final control of the tripping of the circuit breakers.

In the modification of my invention shown in Fig. 2 instead of employing two ratio balanced differential relays as shown in Fig. 1, I have illustrated a single ratio balanced relay 35 of the type disclosed in my United States Letters Patent 1,637,032, dated July 26, 1927, and assigned to the same assignee as this invention. This relay comprises a disk 36 having two shaded pole motor elements 37 and 38, schematically illustrated, arranged to be energized in accordance with the currents of the circuits 6 and 7 and to exert opposing torques on the disk 36 the material of which is so distributed that movement of the disk in response to a difference between the torques exerted by the motor elements 37 and 38 tends to equilibrate the torques. This produces a characteristic similar to that shown by the line ABC in Fig. 3. With this relay 35 whose contacts 130', 140' are respectively arranged in series with the contacts 113, 114 of the relay 15 in the circuits of the trip coils of the circuit breakers 8 and 10, selective ratio balance is obtained with one device instead of two. Outside of this difference in differential relay means, the arrangement shown in Fig. 2 is similar to that shown in Fig. 1, the relay 15 being more schematically illustrated.

While I have shown and described my invention in considerable detail, I do not desire to be limited to the exact arrangements shown but seek to cover in the appended claims all modifications that fall within the true spirit and scope of my invention.

What I claim as new and desire to secure by Letters Patent of the United States, is:—

1. In combination with two parallel circuits and circuit interrupting means for controlling the circuits, means for selectively controlling said circuit interrupting means on the occurrence of unbalanced circuit conditions including relay means operative when the ratio between the currents in said circuits exceeds a predetermined value, and cooperating relay means connected to be energized in accordance with the difference between the sum of and the difference between the circuit currents.

2. In combination with two parallel circuits and circuit interrupting means for controlling the circuits, means for selectively controlling said circuit interrupting means on the occurrence of unbalanced circuit conditions including a differential relay for each of said circuits arranged to operate only when the ratio between the currents in corresponding conductors of said circuits exceeds a predetermined value, and a cooperating directional relay connected to be energized in accordance with the sum of and the difference between the currents in corresponding conductors of said circuits.

3. In combination with two parallel circuits and circuit interrupting means for controlling the circuits, cooperating relay means for selectively effecting the opening of the interrupting means in either circuit only when the ratio of the current in either circuit to the current in the other circuit exceeds a predetermined value and the product of the sum of and the difference between the circuit currents exceeds a predetermined value.

4. In combination with two parallel circuits and circuit breakers for controlling the circuits, means for selectively controlling the opening of said circuit breakers on the occurrence of unbalanced circuit conditions including a trip coil for each circuit breaker, a circuit for said trip coil including two normally opened contacts in series, differential relay means for controlling one contact in accordance with the ratio between the currents in corresponding conductors of the circuit, and directional relay means for controlling the other contact in accordance with the product of the sum of and the difference between the currents in corresponding conductors of the circuits.

5. In combination with two parallel circuits and circuit interrupting means for controlling the circuits, relay means connected to be energized in accordance with the currents of said circuits for selectively controlling said interrupting means in accordance with the ratio of the circuit currents and the product of the sum of and the difference between the circuit currents.

6. In combination with two parallel circuits and circuit interrupting means for controlling the circuits, and means for selectively controlling said circuit interrupting means including differential relay means connected to be energized in accordance with the circuit currents and arranged to operate on a predetermined unbalance between the circuit currents and cooperating directional relay means connected to be energized in accordance with the product of the sum of and the difference between the circuit currents.

In witness whereof, I have hereunto set my hand this 12th day of May, 1928.

OLIVER C. TRAVER.